(12) United States Patent
Kanazawa

(10) Patent No.: US 12,531,405 B2
(45) Date of Patent: Jan. 20, 2026

(54) RELAY DEVICE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Akira Kanazawa, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 224 days.

(21) Appl. No.: 18/257,437

(22) PCT Filed: Dec. 2, 2021

(86) PCT No.: PCT/JP2021/044282
§ 371 (c)(1),
(2) Date: Jun. 14, 2023

(87) PCT Pub. No.: WO2022/131005
PCT Pub. Date: Jun. 23, 2022

(65) Prior Publication Data
US 2024/0030701 A1    Jan. 25, 2024

(30) Foreign Application Priority Data

Dec. 17, 2020    (JP) .................................. 2020-209467

(51) Int. Cl.
*H02H 3/20* (2006.01)
(52) U.S. Cl.
CPC ..................................... *H02H 3/20* (2013.01)

(58) Field of Classification Search
CPC ............ H02H 3/20; H02H 3/08; H02H 3/087; H02H 3/28; B62D 5/04; B62D 5/0487; B62D 5/0409
(Continued)

(56) References Cited

U.S. PATENT DOCUMENTS

2003/0142449 A1\*   7/2003   Iwata ................... H02H 1/0015
                                                                361/87
2009/0257159 A1   10/2009   Imai et al.
(Continued)

FOREIGN PATENT DOCUMENTS

| JP | 2001-160746 A | 6/2001 |
|----|---------------|--------|
| JP | 2013-034381 A | 2/2013 |
| JP | 2020-111882 A | 7/2020 |

OTHER PUBLICATIONS

International Search Report, Application No. PCT/JP2021/044282, mailed Feb. 15, 2022. ISA/Japan Patent Office.

*Primary Examiner* — Danny Nguyen
(74) *Attorney, Agent, or Firm* — Honigman LLP

(57) ABSTRACT

A relay device is provided with a first terminal electrically connected to a first target, a second terminal electrically connected to a second target, a relay configured to switch on/off of an electrical connection between the first terminal and the second terminal, and a control unit configured to perform ON/OFF control of the relay. The control unit executes, by hardware, first OFF control for comparing a first voltage of the first terminal with a first threshold voltage, and turning off the relay based on a result of the comparison. The control unit executes, by software, second OFF control for comparing the first voltage with a second threshold voltage higher than the first threshold voltage, and turning off the relay based on a result of the comparison.

9 Claims, 7 Drawing Sheets

(58) Field of Classification Search
USPC .................................... 361/56–87, 93.7–93.9
See application file for complete search history.

(56) References Cited

U.S. PATENT DOCUMENTS

| | | | |
|---|---|---|---|
| 2014/0239713 A1* | 8/2014 | Kanzaki | H02H 11/003 |
| | | | 307/11 |
| 2015/0109020 A1* | 4/2015 | Morino | G01R 31/52 |
| | | | 324/764.01 |
| 2018/0198271 A1* | 7/2018 | Morimoto | H02H 3/087 |
| 2022/0085747 A1* | 3/2022 | Iwagami | B60L 3/003 |
| 2022/0274641 A1* | 9/2022 | Obara | B62D 5/0409 |

* cited by examiner

RELAY DEVICE

CROSS-REFERENCE TO RELATED APPLICATIONS

This application is the U.S. national stage of PCT/JP2021/044282 filed on Dec. 2, 2021, which claims priority of Japanese Patent Application No. JP 2020-209467 filed on Dec. 17, 2020, the contents of which are incorporated herein.

TECHNICAL FIELD

The present disclosure relates to a relay device.

BACKGROUND

JP 2013-034381A describes a technology for turning off a relay when a short circuit occurs.

There are both large-scale short circuits in which the short circuit current is relatively large, and small-scale short circuits in which the short circuit current is relatively small. The technology of JP 2013-034381A does not take into consideration the scale of the short circuit.

In view of this, an object is to provide a technology that can appropriately turn off a relay regardless of whether the short circuit is large or small in scale.

SUMMARY

A relay device of the present disclosure is a relay device for switching on/off of an electrical connection between a first target and a second target, including a first terminal electrically connected to the first target, a second terminal electrically connected to the second target, a relay configured to switch on/off of the electrical connection between the first terminal and the second terminal, and a control unit configured to perform ON/OFF control of the relay, the control unit executing, by hardware, first OFF control for comparing a first voltage of the first terminal with a first threshold voltage and turning off the relay based on a result of the comparison, and executing, by software, second OFF control for comparing the first voltage with a second threshold voltage higher than the first threshold voltage and turning off the relay based on a result of the comparison.

Advantageous Effects

According to the present disclosure, a relay can be appropriately turned off regardless of whether the short circuit is large or small in scale.

DETAILED DESCRIPTION OF PREFERRED EMBODIMENTS

Figure 1:
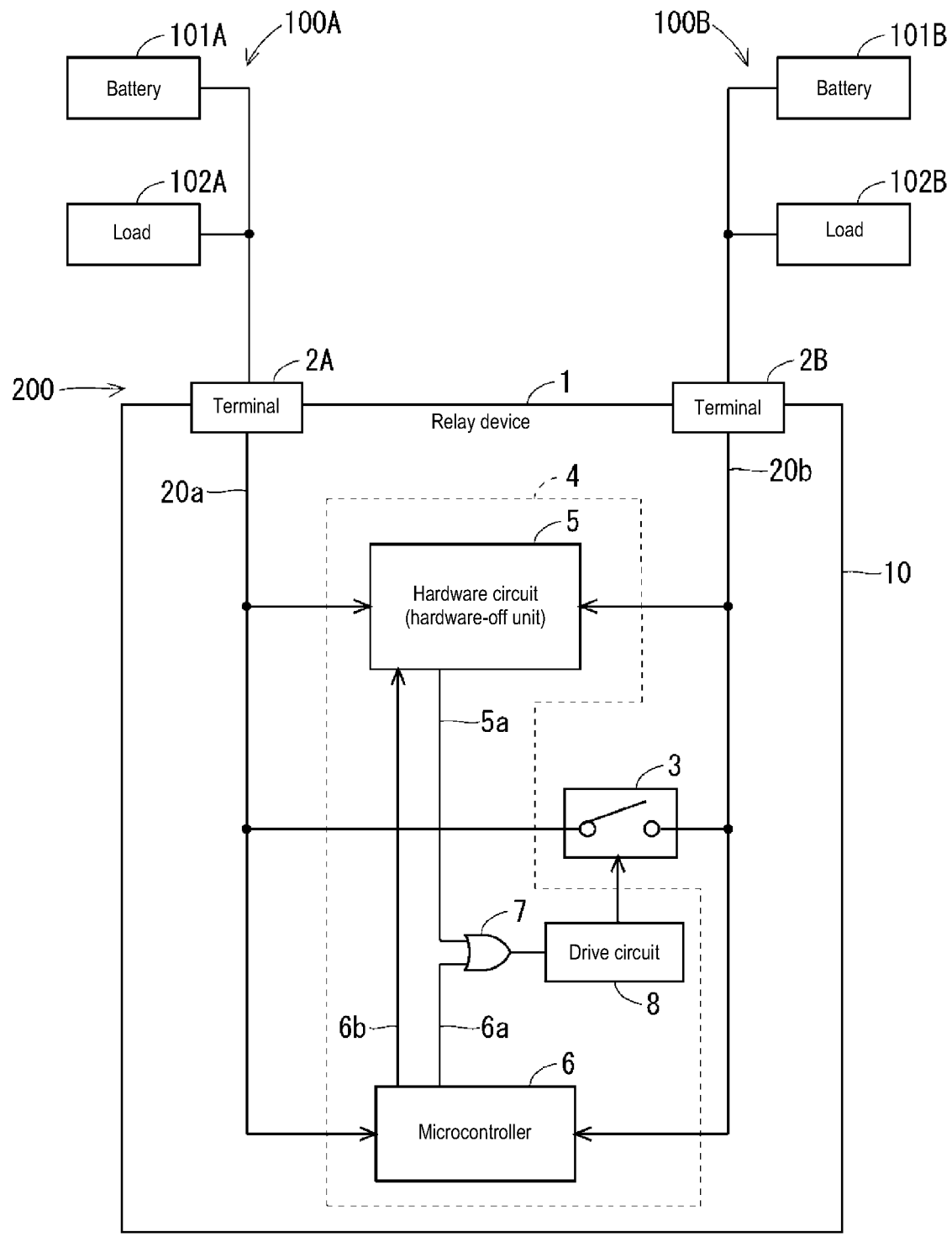
FIG. 1 is a schematic diagram showing an example of the configuration of a relay device.

Initially, implementation modes of the present disclosure will be enumerated and described.

A relay device of the present disclosure is as follows.

(1) A relay device for switching on/off of an electrical connection between a first target and a second target, including a first terminal electrically connected to the first target, a second terminal electrically connected to the second target, a relay configured to switch on/off of the electrical connection between the first terminal and the second terminal, and a control unit configured to perform ON/OFF control of the relay, the control unit executing, by hardware, first OFF control for comparing a first voltage of the first terminal with a first threshold voltage and turning off the relay based on a result of the comparison, and executing, by software, second OFF control for comparing the first voltage with a second threshold voltage higher than the first threshold voltage and turning off the relay based on a result of the comparison. According to the present disclosure, first OFF control for comparing the first voltage of the first terminal electrically connected to the first target with a relatively low first threshold voltage and turning off the relay based on the comparison result is executed by hardware. The relay can thereby be turned off by hardware, when the first voltage becomes low due to the short circuit in the first target being large in scale. As a result, in the case where the short circuit in the first target is large in scale, the electrical connection between the first target and the second target can be turned off straightaway by hardware. Therefore, the second target is unlikely to be affected by a short circuit that occurs in the first target. Furthermore, according to the present disclosure, second OFF control for comparing the first voltage of the first terminal electrically connected to the first target with the relatively high second threshold voltage and turning off the relay based on the comparison result is executed by software. The relay can thereby be turned off by software, when the first voltage does not decrease all that much due to the short circuit in the first target being small in scale. In this way dedicated hardware is not required, due to the relay being turned off by software, thus enabling the circuit to be reduced in size. On the other hand, even though it takes a little time to turn off the relay in the case where the relay is turned off by software, the short circuit in the first target being small in scale means that the second target is not affected much by the short circuit in the first target prior to the relay being turned off. Therefore, the relay can be appropriately turned off regardless of whether the short circuit is large or small in scale.

(2) In the first OFF control by hardware, the relay may be turned off when the first voltage is lower than the first threshold voltage for at least a first threshold period. In this case, the relay is turned off when the state where the first voltage is lower than the first threshold voltage continues, thus reducing the possibility of the relay being erroneously turned off despite a short circuit not having occurred in the first target.

(3) In the second OFF control by software, the relay may be turned off when the first voltage is lower than the second threshold voltage for at least a threshold period. In this case, the relay is turned off when the state where the first voltage is lower than the threshold voltage continues, thus reducing the possibility of the relay being erroneously turned off despite a short circuit not having occurred in the first target.

(4) In the second OFF control by software, the relay may be turned off when the first voltage is lower than the second threshold voltage for at least a second threshold period longer than the first threshold period. In this case, in the second OFF control by software, the relay is turned off when the state where the first voltage is lower than the second threshold voltage continues for a relatively long time. When the short circuit in the first target is small in scale, the electrical connection between the first target and the second target can thereby be maintained for a relatively long time.

(5) The control unit may execute third OFF control for comparing the first voltage with a third threshold voltage higher than the first threshold voltage and lower than the second threshold voltage and turning off the relay based on a result of the comparison, and, in the third OFF control by software, the relay may be turned off when the first voltage is lower than the third threshold voltage for at least a third threshold period longer than the first threshold period and shorter than the second threshold period. In this case, due to the second OFF control by software, the electrical connection between the first target and the second target is maintained for a relatively long time, when the short circuit in the first target is fairly small. On the other hand, due to the third OFF control by software, the electrical connection between the first target and the second target is maintained for a relatively short time, when the short circuit in the first target is not so small. Therefore, the time for which the electrical connection between the first target and the second target is maintained can be appropriately changed, according to the scale of the short circuit in the first target.

(6) The control unit may execute, by software, ON control for comparing the first voltage with a third threshold voltage higher than the first threshold voltage and the second threshold voltage and turning on the relay based on a result of the comparison. In this case, the ON control for comparing the first voltage with the third threshold voltage and turning on the relay based on the comparison result is executed by software. In this way, dedicated hardware is not required, due to the relay being turned on by software, thus enabling the circuit to be reduced in size.

(7) In the first OFF control by hardware, the relay may be turned off when the first voltage is lower than the first threshold voltage for at least a first threshold period, and, in the ON control by software, the relay may be turned on when the first voltage is higher than the third threshold voltage for at least a second threshold period longer than the first threshold period. In this case, in the ON control by software, the relay is turned on when the state where the first voltage is higher than the third threshold voltage continues for a relatively long time, thus reducing the possibility of the relay being erroneously turned on despite the short circuit in the first target not having been eliminated.

(8) In the second OFF control by software, the relay may be turned off when the first voltage is lower than the second threshold voltage for at least a first threshold period, and, in the ON control by software, the relay may be turned on when the first voltage is higher than the third threshold voltage for at least a second threshold period shorter than the first threshold period. In this case, in the ON control by software, the relay is turned on even if the duration of the state where the first voltage is higher than the third threshold voltage is not so long, thus enabling the relay to be turned on straightaway in the case where the short circuit in the first target has been eliminated.

(9) The control unit may execute, by hardware, fourth OFF control for comparing a second voltage of the second terminal with a fourth threshold voltage and turning off the relay based on a result of the comparison, and may execute, by software, fifth OFF control for comparing the second voltage with a fifth threshold voltage higher than the fourth threshold voltage and turning off the relay based on a result of the comparison. In this case, the relay can also be similarly turned off when a short circuit occurs in the second target, not only when a short circuit occurs in the first target.

Specific examples of a rely device of the present disclosure will be described below with reference to the drawings. Note that the present disclosure is not limited to these illustrative examples and is indicated by the claims, and all changes that come within the meaning and range of equivalency of the claims are intended to be embraced therein.

Outline of Relay Device

FIG. 1 is a schematic diagram showing an example of a relay device 1. The relay device 1 is a relay device that switches the electrical connection between a first target and a second target on and off, and is installed in an automobile, for example. The first and second targets are systems that each include a battery and a load that is supplied with power output by the battery. The example of the first and second targets is not limited thereto. Also, the relay device 1 is not limited to being installed in an automobile.

The relay device 1 shown in FIG. 1 includes a terminal 2A, a terminal 2B, a relay 3, a control unit 4, and a case 10 that houses the terminals 2A and 2B, the relay 3 and the control unit 4. The terminals 2A and 2B are partially exposed from the case 10. A system 100A serving as the first target is electrically connected to the terminal 2A. A system 100B serving as the second target is electrically connected to the terminal 2B. The relay device 1 can switch the electrical connection between the system 100A and the system 100B on and off. The relay device 1 is provided intermediately in wiring that electrically connects the system 100A and the system 100B. In this example, the system 100A, the system 100B and the relay device 1 constitute a system 200. The system 200 is, for example, a battery system provided with a plurality of batteries. The battery system can also be said to be a power supply system.

The system 100A is, for example, provided with a battery 101A and a load 102A electrically connected to an output terminal of the battery 101A. The load 102A is supplied with power output by the battery 101A. The load 102A performs operations based on the power from battery 101A. The terminal 2A is electrically connected to the output terminal of the battery 101A and the load 102A. The output voltage of the battery 101A is supplied to the terminal 2A. The battery 101A is, for example, a secondary battery. The battery 101A may also be a lead-acid battery, a lithium-ion battery, or another type of battery. The battery 101A normally outputs a voltage of 12.6 V for example. The battery 101A is charged by an alternator, for example. The load 102A may, for example, be a car navigation system, an electric power steering system, or another type of load.

The system 100B is, for example, provided with a battery 101B and a load 102B electrically connected to the output terminal of the battery 101B. The load 102B is supplied with power output by the battery 101B. The load 102B performs operations based on the power from the battery 101B. The terminal 2B is electrically connected to the output terminal of the battery 101B and the load 102B. The output voltage of the battery 101B is supplied to the terminal 2B. The battery 101B is, for example, a secondary battery. The battery 101B may also be a lead-acid battery, a lithium-ion battery, or another type of battery. The battery 101B normally outputs a voltage of 12.6V for example. The battery 101B is charged by an alternator, for example. The load 102B may, for example, be a car navigation system, an electric power steering system, or another type of load. The load 102B may be a similar load to the load 102A or may be a different load.

The relay 3 can switch the electrical connection between the terminal 2A and the terminal 2B on and off. Given that the systems 100A and 100B are electrically connected to the terminals 2A and 2B, respectively, it can be said that the relay 3 can switch the electrical connection between the system 100A and the system 100B on and off. The relay 3 may be a contact relay (also called a mechanical relay) provided with a coil and a switch, or a non-contact relay provided with a semiconductor device such as a MOSFET (Metal Oxide Semiconductor Field Effect Transistor).

When the relay 3 is on, the systems 100A and 100B are electrically connected, due to the terminals 2A and the terminals 2B being electrically connected. Both the battery 101A and the battery 101B are thereby electrically connected to the load 102A of the system 100A. Accordingly, when the relay 3 is on, the load 102A is able to operate based not only on the output power of the battery 10A but also on the output power of the battery 101B. Similarly, both the battery 101B and the battery 101A are electrically connected to the load 102B of the system 100B. Accordingly, the load 102B is able to operate based not only on the output power of the battery 101B but also on the output power of the battery 101A.

The control unit 4 can perform ON/OFF control of the relay 3. In this example, the relay 3 is, for example, a normally-on relay, and is on when being not driven. When an OFF condition for turning off the relay 3 is satisfied, the control unit 4 drives the relay 3 to turn off the relay 3. Then, when an ON condition for turning on the relay 3 is satisfied, the control unit 4 stops driving the relay 3 to turn on the relay 3. There may be a plurality of OFF conditions, and there may be a plurality of ON conditions. The relay 3 may be a normally-off relay.

In this example, the control unit 4 performs ON/OFF control of the relay 3 based on the voltages of the terminals 2A and 2B, for example. If a voltage 20a (also referred to as first voltage 20a) of the terminal 2A decreases when the relay 3 is on, for example, the control unit 4 drives the relay 3 to turn off the relay 3. The control unit 4 is thereby able to turn off the relay 3, when the first voltage 20a decreases due to a short circuit occurring in the system 100A caused by wiring connected to the output terminal of the battery 101A being short-circuited or the like. Therefore, the system 100B is unlikely to be affected by a short circuit in the system 100A. For example, the output voltage of the battery 101B is unlikely to decrease due to a short circuit in the system 100A.

Similarly, if a voltage 20b (also referred to as second voltage 20b) of the terminal 2B decreases when the relay 3 is on, the control unit 4 drives the relay 3 to turn off the relay 3. The control unit 4 is thereby able to turn off the relay 3, when the second voltage 20b decreases due to a short circuit occurring in the system 100B caused by electrical wires connecting the system 100B and the terminal 2B being short-circuited or the like. Therefore, the system 100A is unlikely to be affected by a short circuit in the system 100B.

Also, if the first voltage 20a increases when the relay 3 is off, the control unit 4 stops driving the relay 3 to turn on the relay 3. The control unit 4 is thereby able to turn on the relay 3, when the short circuit in the system 100A has been eliminated and the first voltage 20a increases. Therefore, when the short circuit in the system 100A has been eliminated, the system 100A and the system 100B can be electrically connected.

Similarly, if the second voltage 20b increases when the relay 3 is off, the control unit 4 stops driving the relay 3 to turn on the relay 3. The control unit 4 is thereby able to turn on the relay 3, when the short circuit in the system 100B has been eliminated and the second voltage 20b increases. Therefore, when the short circuit in the system 100B has been eliminated, the system 100B and the system 100A can be electrically connected.

The control unit 4 is provided with a hardware circuit 5, a microcontroller 6, an OR circuit 7, and a drive circuit 8, for example. The drive circuit 8 is constituted by a transistor and a resistor, for example, and is able to drive the relay 3. The drive circuit 8 is controlled by the hardware circuit 5 and the microcontroller 6.

The hardware circuit 5 is constituted by a transistor, a resistor and a capacitor, for example, and can turn off the relay 3 when the relay 3 is on. When the relay 3 is on, the hardware circuit 5 functions as a hardware-off unit 5 that executes OFF control for turning off the relay 3, by hardware, based on the first voltage 20a of the terminal 2A. When the relay 3 is on, the hardware-off unit 5 can also execute OFF control for turning off the relay 3, by hardware, based on the second voltage 20b of the terminal 2B. Here, processing such as control being executed by hardware means that processing such as control is executed only by hardware without using software (in other words, programs). Processing by hardware is processing whose execution does not require software. The hardware-off unit 5 is constituted by a hardware circuit that does not require software (in other words, programs) to execute the function thereof, for example. Accordingly, the hardware-off unit 5 does not store software. When turning off the relay 3, the hardware-off unit 5 outputs a hardware-off signal 5a. The hardware-off signal 5a indicates the digital value "1", for example. Hereafter, "1" and "0" indicate digital values.

The microcontroller 6 is a type of computer. When the relay 3 is on, the microcontroller 6 can execute OFF control for turning off the relay 3, by software, based on the first voltage 20a. Also, when the relay 3 is on, the microcontroller 6 can execute OFF control for turning off the relay 3, by software, based on the second voltage 20b. Here, processing such as control being executed by software means that processing such as control is executed by a computer executing software (in other words, programs). Processing by software is processing that is realized by execution of software by a computer. Processing by software can also be said to be processing that is described in software. When turning off the relay 3, the microcontroller 6 outputs a software-off signal 6a. The software-off signal 6a indicates "1", for example.

Also, when the relay 3 is off, the microcontroller 6 can execute ON control for turning on the relay 3, by software, based on the first voltage 20a. Also, when the relay 3 is off, the microcontroller 6 can execute ON control for turning on the relay 3, by software, based on the second voltage 20b. When turning on the relay 3, the microcontroller 6 stops output of the software-off signal 6a. Also, the microcontroller 6 outputs, to the hardware-off unit 5, a hardware-off inhibiting signal 6b instructing the hardware-off unit 5 to not output the hardware-off signal 5a. The hardware-off inhibiting signal 6b indicates "1", for example. The hardware-off unit 5 does not output the hardware-off signal 5a while the hardware-off inhibiting signal 6b is being input, regardless of the first voltage 20a and the second voltage 20b.

The hardware-off signal 5a and the software-off signal 6a are input to the OR circuit 7. The OR circuit 7 outputs "1" when the hardware-off signal 5a is being input. Also, the OR circuit 7 outputs "1" when the software-off signal 6a is being input. The OR circuit 7 outputs "0" when both the hardware-off signal 5a and the software-off signal 6a are not being input. When the output of the OR circuit 7 indicates "1", the drive circuit 8 drives the relay 3 to turn off the relay 3. On the other hand, when the output of the OR circuit 7 indicates "0", the drive circuit 8 turns on the relay 3 by not driving the relay 3.

In the relay device 1 provided with the above configuration, the relay 3 will be off, when the hardware-off unit 5 is outputting the hardware-off signal 5a. Also, the relay 3 will be off, when the microcontroller 6 is outputting the software-off signal 6a. On the other hand, the relay 3 will be on, when the hardware-off unit 5 is not outputting the hardware-off signal 5a and the microcontroller 6 is not outputting the software-off signal 6a. The hardware-off unit 5 is thereby able to turn off the relay 3, by outputting the hardware-off signal 5a when the relay 3 is on. Also, the microcontroller 6 is able to control on/off of the relay 3, by outputting and stopping output of the software-off signal 6a, when the hardware-off unit 5 is not outputting the hardware-off signal 5a.

Example Configuration of Hardware Off Unit

Figure 2:
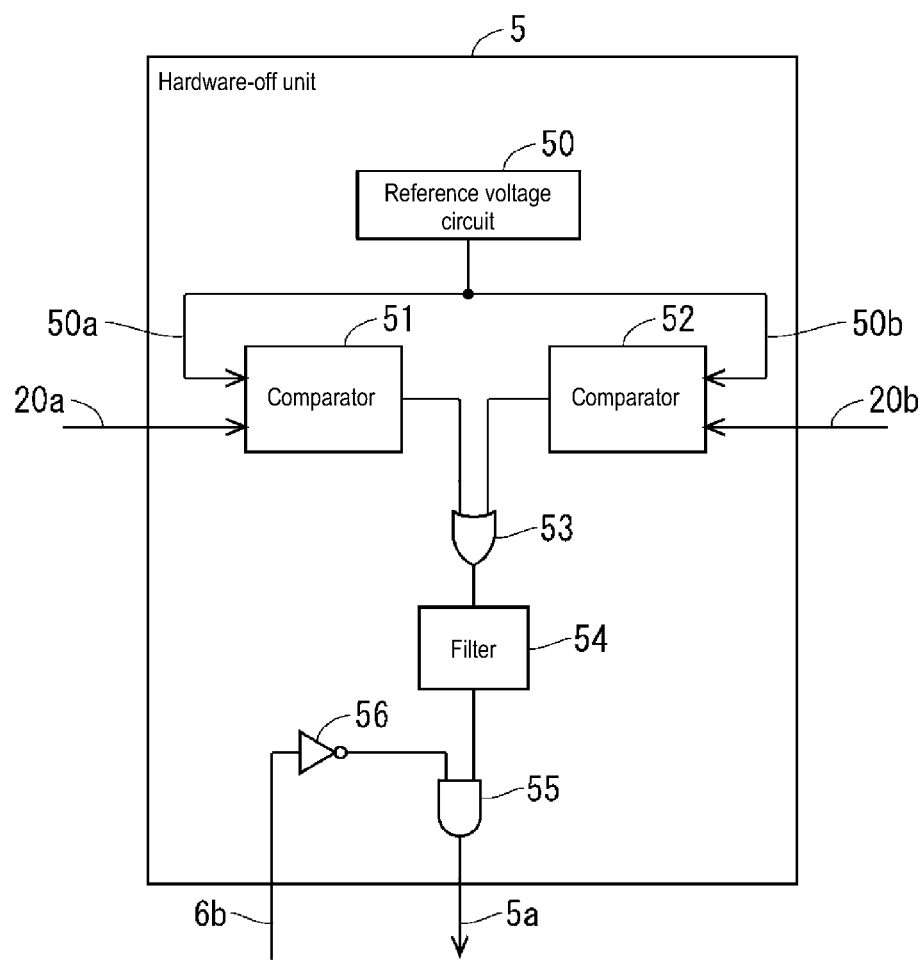
FIG. 2 is a schematic diagram showing an example of the configuration of a hardware-off unit.

FIG. 2 is a schematic diagram showing an example of the configuration of the hardware-off unit 5 (in other words, the hardware circuit 5). As shown in FIG. 2, the hardware-off unit 5 is provided with a reference voltage circuit 50, a comparator 51, a comparator 52, an OR circuit 53, a filter 54, an AND circuit 55, and a NOT circuit 56, for example. The reference voltage circuit 50 generates and outputs a reference voltage. The reference voltage is, for example, 8 V. The power source of the reference voltage circuit 50 is a different battery from the battery 101A and the battery 101B, for example.

The comparator 51 compares the first voltage 20a with a first threshold voltage 50a. The comparator 51 outputs "1" when the first voltage 20a is lower than the first threshold voltage 50a. On the other hand, the comparator 51 outputs "0" when the first voltage 20a is higher than or equal to the first threshold voltage 50a.

The comparator 52 compares the second voltage 20b with a second threshold voltage 50b. The comparator 52 outputs "1" when the second voltage 20b is lower than the second threshold voltage 50b. On the other hand, the comparator 52 outputs "0" when the second voltage 20b is higher than or equal to the second threshold voltage 50b.

The reference voltage that is generated by the reference voltage circuit 50 is input to the comparator 51 as the first threshold voltage 50a, for example. Also, the reference voltage is input to the comparator 52 as the second threshold voltage 50b, for example. In this example, the first threshold voltage 50a and the second threshold voltage 50b are the same value, which is 8 V for example.

The outputs of the comparator 51 and the comparator 52 are input to the OR circuit 53. The output of the OR circuit 53 indicates "1" when at least one of the two inputs indicates "1". On the other hand, the output of the OR circuit 53 indicates "0" when both of the two inputs indicate "0".

The filter 54 filters and outputs the output of the OR circuit 53. The filter 54 is, for example, a glitch removal filter, and does not pass signals having a pulse width of shorter than a first threshold period. The filter 54 outputs "0" when the output of the OR circuit 53 indicates "0". Also, when the output of the OR circuit 53 changes from "0" to "1", the filter 54 does not output "1" straightaway and starts outputting "1" when the output of the OR circuit 53 indicates "1" for at least the first threshold period. The filter 54 then immediately outputs "0" when the output of the OR circuit 53 changes from "1" to "0". Even after the output of the OR circuit 53 changes from "0" to "1", the filter 54 continues to output "0" when the output changes to "0" before the first threshold period elapses. The first threshold period is set to 500 μs, for example.

The hardware-off inhibiting signal 6b is input to the NOT circuit 56. The NOT circuit 56 outputs "0" when the hardware-off inhibiting signal 6b is being input. On the other hand, the NOT circuit 56 outputs "1" when the hardware-off inhibiting signal 6b is not being input.

The output of the filter 54 and the output of the NOT circuit 56 are input to the AND circuit 55. The AND circuit 55 outputs "1" when both the output of the filter 54 and the output of the NOT circuit 56 indicate "1". On the other hand, the AND circuit 55 outputs "0" when at least one of the output of the filter 54 and the output of the NOT circuit 56 indicates "0". The signal indicating "1" that is output by the AND circuit 55 is input to the OR circuit 7 as the hardware-off signal 5a.

In the hardware-off unit 5 having a configuration such as the above, "1" is input to the filter 54, when the first voltage 20a is lower than the first threshold voltage 50a (for example, 8 V). "1" is then output by the filter 54, when the first voltage 20a is lower than the first threshold voltage 50a for at least the first threshold period (for example, 500 μm). At this time, the hardware-off signal 5a is output by the AND circuit 55, when the hardware-off inhibiting signal 6b is not being input to the hardware-off unit 5. Therefore, in the case where the hardware-off inhibiting signal 6b is not being input to the hardware-off unit 5 and the relay 3 is on, the hardware-off unit 5 turns off the relay 3, when the first voltage 20a is lower than the first threshold voltage 50a for at least the first threshold period. On the other hand, even if the first voltage 20a decreases to lower than the first threshold voltage 50a, the hardware-off unit 5 does not turn off the relay 3, when the state where the first voltage 20a is lower than the first threshold voltage 50a has continued for shorter than the first threshold period.

Similarly, in the case where the hardware-off inhibiting signal 6b is not being input to the hardware-off unit 5 and the relay 3 is on, the hardware-off unit 5 turns off the relay 3, when the second voltage 20b is lower than the second threshold voltage 50b for at least the first threshold period. On the other hand, even if the second voltage 20b decreases to lower than the second threshold voltage 50b, the hardware-off unit 5 does not turn off the relay 3 when the state where the second voltage 20b is lower than the second threshold voltage 50b has continued for shorter than the first threshold period.

Subsequently, the first threshold voltage 50a and the second threshold voltage 50b may be referred to as a first hardware-off voltage and a second hardware-off voltage, respectively. Also, the first threshold period of the filter 54 may be referred to as a hardware-off start period.

In this way, in the case where the relay 3 is on, the hardware-off unit 5 turns off the relay 3 when the first voltage 20a is lower than the first hardware-off voltage for at least the hardware-off start period. The relay 3 is thereby turned off, when the first voltage 20a decreases to lower than the first hardware-off voltage (for example, 8 V) due to a short circuit that is relatively large in scale occurring in the system 100A, and this state continues for at least the hardware-off start period (for example, 500 μs). As a result, the system 100B is unlikely to be affected by a short circuit that occurs in the system 100A.

Also, in the case where the relay 3 is on, the hardware-off unit 5 turns off the relay 3 when the second voltage 20b is lower than the second hardware-off voltage for at least the hardware-off start period. The relay 3 is thereby turned off, when the second voltage 20b decreases to lower than the second hardware-off voltage (for example, 8 V) due to a short circuit that is relatively large in scale occurring in the system 100B, and this state continues for at least the hardware-off start period (for example, 500 μs). As a result, the system 100A is unlikely to be affected by a short circuit that occurs in the system 100B.

Example Configuration of Microcontroller

Figure 3:
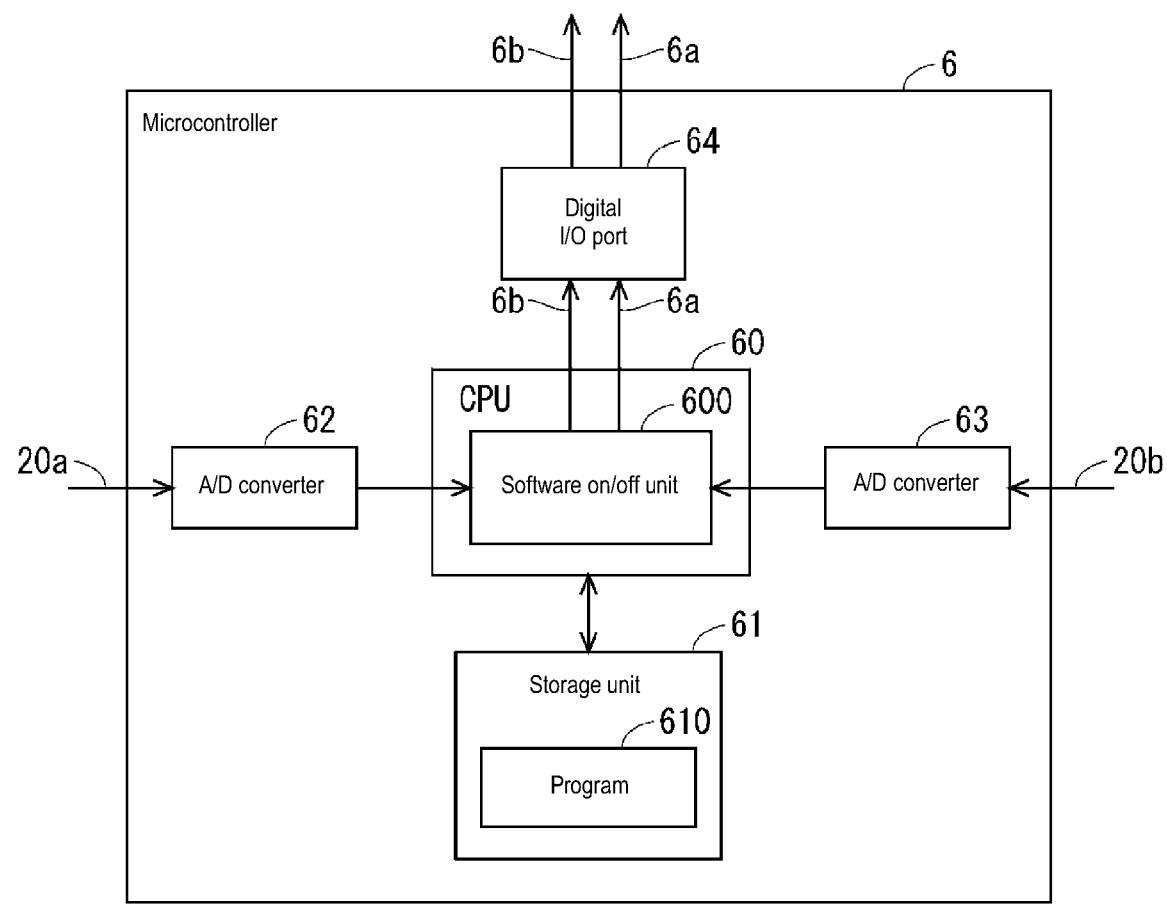
FIG. 3 is a schematic diagram showing an example of the configuration of a microcontroller.

FIG. 3 is a schematic diagram showing an example of the configuration of the microcontroller 6. As shown in FIG. 3, the microcontroller 6 is provided with a CPU (Central Processing Unit) 60, which is a type of processor, a storage unit 61, an A/D converter 62, an A/D converter 63, and a digital I/O port 64, for example.

The storage unit 61 can be said to be a storage circuit. The storage unit 61 includes a non-transitory recording medium readable by the CPU 60, such as a ROM (Read Only Memory) and a RAM (Random Access Memory). The storage unit 61 stores a program 610 for controlling the microcontroller 6, and the like. The various functions of the microcontroller 6 are realized by the CPU 60 executing the program 610 stored in the storage unit 61. In this example, a software on/off unit 600 that executes ON/OFF control of the relay 3 is formed as a functional block in the CPU 60, due to the CPU 60 executing the program 610.

The A/D converter 62 converts the first voltage 20a at the terminal 2A from an analog value to a digital value and inputs the digital value to the software on/off unit 600. The A/D converter 63 converts the second voltage 20b at the terminal 2B from an analog value to a digital value and inputs the digital value to the software on/off unit 600.

The software on/off unit 600 can compare the first voltage 20a (digital value) that is input with a third threshold voltage, and turn off the relay 3 based on the comparison result. For example, in the case where the relay 3 is on, the software on/off unit 600 outputs the software-off signal 6a when the first voltage 20a is lower than the third threshold voltage for at least a second threshold period. The software-off signal 6a is input to the OR circuit 7 through the digital I/O port 64. In the case where the relay 3 is on, the relay 3 is thereby turned off, when the first voltage 20a is lower than the third threshold voltage for at least the second threshold period. On the other hand, even if the first voltage 20a decreases to lower than the third threshold voltage, the software on/off unit 600 does not turn off the relay 3 when the state where the first voltage 20a is lower than the third threshold voltage has continued for shorter than the second threshold period. The third threshold voltage is set higher than the first threshold voltage and the second threshold voltage. The third threshold voltage is set to 10 V, for example. The second threshold period is set longer than the first threshold period, for example. The second threshold period is set to 10 seconds, for example.

Also, the software on/off unit 600 can compare the second voltage 20b (digital value) that is input with a fourth threshold voltage, and turn off the relay 3 based on the comparison result. For example, in the case where the relay 3 is on, the software on/off unit 600 outputs the software-off signal 6a when the second voltage 20b is lower than the fourth threshold voltage for at least a third threshold period. In the case where the relay 3 is on, the relay 3 is thereby turned off, when the second voltage 20b is lower than the fourth threshold voltage for at least the third threshold period. On the other hand, even if the second voltage 20b decreases to lower than the fourth threshold voltage, the software on/off unit 600 does not turn off the relay 3 when the state where the second voltage 20b is lower than the fourth threshold voltage has continued for shorter than the third threshold period. The fourth threshold voltage is set higher than the first threshold voltage and the second threshold voltage. The fourth threshold voltage is the same as the third threshold voltage, for example, and is set to 10 V for example. The third threshold period is set longer than the first threshold period, for example. The third threshold period is set to the same as the second threshold period, for example, and is set to 10 seconds, for example.

Also, the software on/off unit 600 compares the first voltage 20a that is input with a fifth threshold voltage, and compares the second voltage 20b that is input with a sixth threshold voltage. The software on/off unit 600 can then turn on the relay 3 based on the comparison results.

For example, in the case where the relay 3 is off, the software on/off unit 600 stops output of the software-off signal 6a and outputs the hardware-off inhibiting signal 6b, when the first voltage 20a and the second voltage 20b are higher than the fifth threshold voltage and the sixth threshold voltage, respectively, for at least the fourth threshold period. The hardware-off inhibiting signal 6b is input to the hardware-off unit 5 through the digital I/O port 64. In the case where the relay 3 is set to off due to the software on/off unit 600 outputting the software-off signal 6a, the relay 3 is thereby turned on due to the software on/off unit 600 stopping output of the software-off signal 6a, when the state where the first voltage 20a and the second voltage 20b are higher than the fifth threshold voltage and the sixth threshold voltage, respectively, has continued for at least the fourth threshold period. Also, in the case where the relay 3 is set to off due to the hardware-off unit 5 outputting the hardware-off signal 5a, the software on/off unit 600 inputs the hardware-off inhibiting signal 6b to the hardware circuit 5, when the first voltage 20a and the second voltage 20b are higher than the fifth threshold voltage and the sixth threshold voltage, respectively, for at least the fourth threshold period. The relay 3 is thereby turned on due to the hardware-off unit 5 stopping output of the hardware-off signal 5a. On the other hand, even if the first voltage 20a and the second voltage 20b increase to higher than the fifth threshold voltage and the sixth threshold voltage, respectively, the software on/off unit 600 does not stop outputting the software-off signal 6a and does not output the hardware-off inhibiting signal 6b, and thus the relay 3 is not turned on, when the state where the first voltage 20a and the second voltage 20b are higher than the fifth threshold voltage and the sixth threshold voltage, respectively, has continued for shorter than the fourth threshold period.

The fifth threshold voltage is set higher than the first threshold voltage 50a, the second threshold voltage 50b, the third threshold voltage, and the fourth threshold voltage. The fifth threshold voltage is set to 12 V, for example. The sixth threshold voltage is set higher than the first threshold voltage 50a, the second threshold voltage 50b, the third threshold voltage, and the fourth threshold voltage. The sixth threshold voltage is set to the same as the fifth threshold voltage, for example, and is set to 12 V, for example. The fourth threshold period is set longer than the first threshold period and is set shorter than the second threshold period and the third threshold period, for example. The fourth threshold period is set to 1 second, for example.

Hereafter, the third threshold voltage and the fourth threshold voltage may be referred to as a first software-off voltage and a second software-off voltage, respectively. Also, the second threshold period and the third threshold period may be referred to as a first software-off start period and a second software-off start period, respectively. Also, the fifth threshold voltage and the sixth threshold voltage may be referred to as a first software-on voltage and a second software-on voltage, respectively. Also, the fourth threshold period may be referred to as a software-on start period.

In this way, the software on/off unit 600 turns off the relay 3 when the first voltage 20a is lower than the first software-off voltage for at least the first software-off start period. The relay 3 is thereby turned off, when the first voltage 20a decreases to lower than the first software-off voltage (for example, 10 V) due to a short circuit that is relatively small in scale occurring in the system 100A, and this state continues for at least the first software-off start period (for example, 10 seconds). As a result, the system 100B is unlikely to be affected by a short circuit that occurs in the system 100A.

Also, the software on/off unit 600 turns off the relay 3 when the second voltage 20b is lower than the second software-off voltage for at least the second software-off start period. The relay 3 is thereby turned off, when the second voltage 20b decreases to lower than the second software-off voltage (for example, 10 V) due to a short circuit that is relatively small in scale occurring in the system 100B, and this state continues for at least the second software-off start period (for example, 10 seconds). As a result, the system 100A is unlikely to be affected a short circuit that occurs in the system 100B.

Also, the software on/off unit 600 turns on the relay 3 when the first voltage 20a and the second voltage 20b are higher than the first software-on voltage and the second software-on voltage, respectively, for at least the software-on start period. The relay 3 is thereby turned on, when the first voltage 20a increases to higher than the first software-on voltage (for example, 12 V) due to a short circuit in the system 100A being eliminated, without a short circuit occurring in the system 100B, and this state continues for at least the software-on start period (for example, 1 second). As a result, the system 100A and the system 100B can be electrically connected, when a short circuit is eliminated in the system 100A. Also, the relay 3 is turned on, when the second voltage 20b increases to higher than the second software-on voltage (for example, 12 V) due to a short circuit in the system 100B being eliminated, without a short circuit occurring in the system 100A, and this state continues for at least the software-on start period (for example, 1 second). As a result, the system 100B and the system 100A can be electrically connected, when a short circuit is eliminated in the system 100B.

Note that the configuration of the microcontroller 6 is not limited to the above example. For example, the microcontroller 6 may be provided with a plurality of CPUs 101. Also, the microcontroller 6 may be provided with a processor capable of executing programs, other than the CPU. Also, the storage unit 61 may be provided with a non-transitory recording medium readable by a computer, other than the ROM and RAM. The storage unit 61 may be provided with a compact hard disk drive, SSD (Solid State Drive) and the like, for example.

Example Operations of Relay Device

Figure 4:
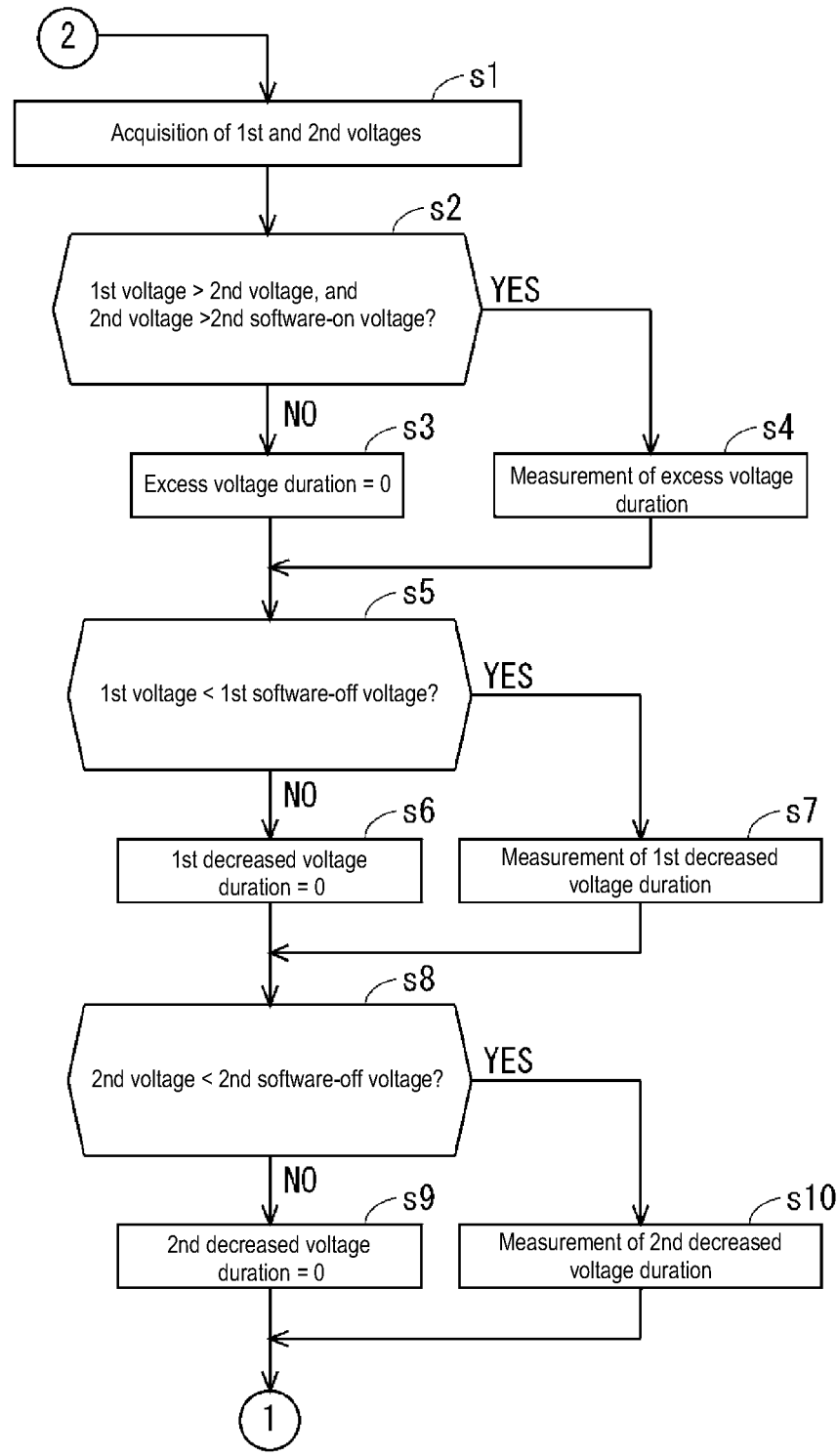
FIG. 4 is a flowchart showing an example of the operations of a software on/off unit.
Figure 5:
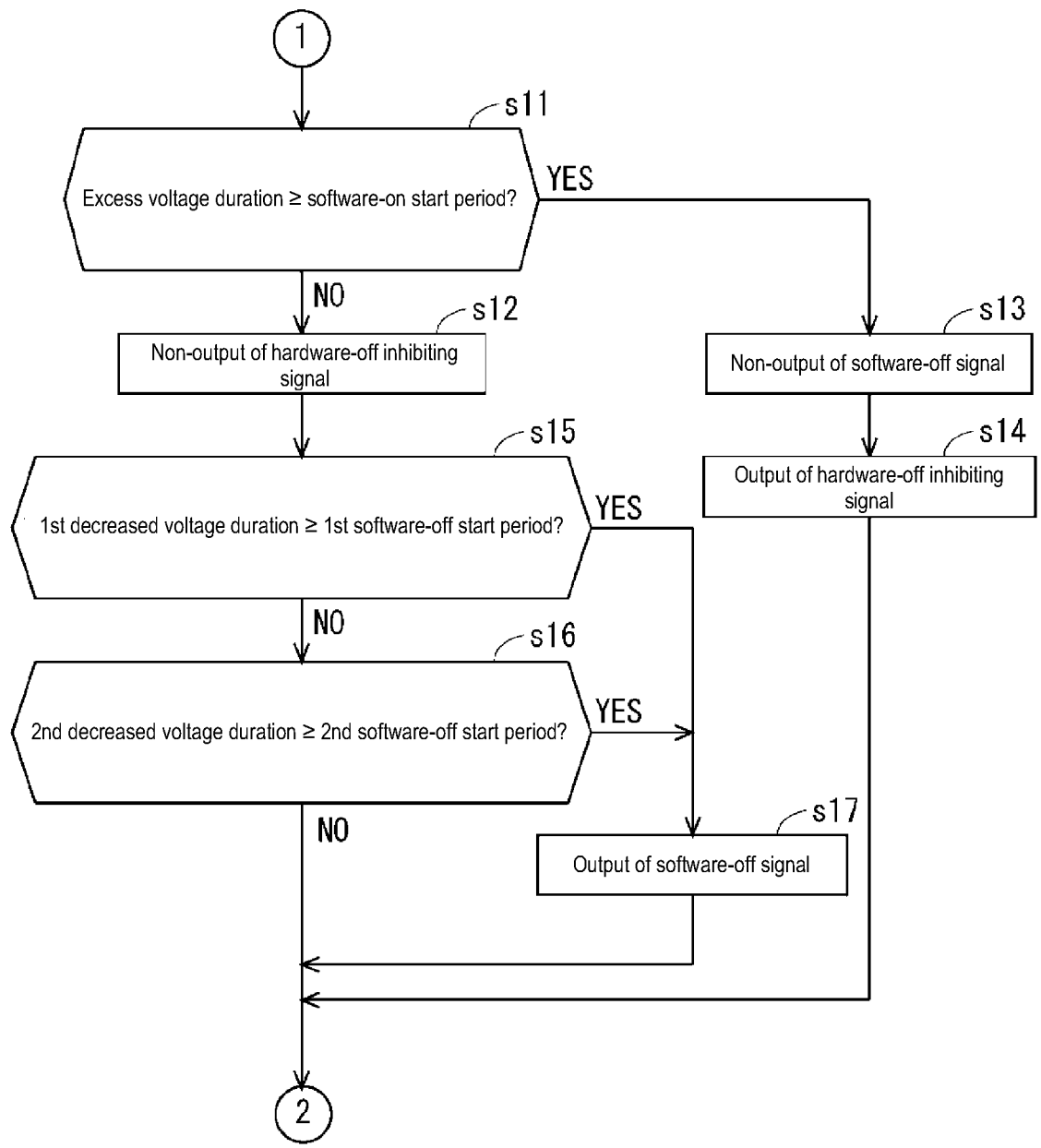
FIG. 5 is a flowchart showing an example of the operations of the software on/off unit.

FIGS. 4 and 5 are flowcharts illustrating an example of operations of the software on/off unit 600. The program 610 in the storage unit 61 contains description of the processing of FIGS. 4 and 5, and the processing of FIGS. 4 and 5 is executed by the CPU 60 executing the program 610.

As shown in FIG. 4, in step s1, the software on/off unit 600 acquires the first voltage 20a and the second voltage 20b from the A/D converter 62 and the A/D converter 63, respectively.

Next, in step s2, the software on/off unit 600 determines whether the first voltage 20a acquired in step s1 is higher than the first software-on voltage (for example, 12 V), and the second voltage 20b acquired in step s1 is higher than the second software-on voltage (for example, 12 V). If it is determined to be NO in step s2, step s3 is executed. On the other hand, if it is determined to be YES in step s2, step s4 is executed.

In step s3, the software on/off unit 600 sets an excess voltage duration to zero. Here, the excess voltage duration means the duration for which the first voltage 20a is higher than the first software-on voltage and the second voltage 20b is higher than the second software-on voltage. After step s3, step s5 is executed. The software on/off unit 600 is able to measure various periods such as the excess voltage duration and a first decreased voltage duration described later, using a timer provided in the microcontroller 6.

In step s4, the software on/off unit 600 determines to measure the excess voltage duration. In step s4, when the excess voltage duration is zero and measurement of the excess voltage duration is not currently being performed, the software on/off unit 600 starts measuring the excess voltage duration. On the other hand, in step s4, when measurement of the excess voltage duration is currently being performed, the software on/off unit 600 continues to measure the excess voltage duration. After step s4, step s5 is executed.

In step s5, the software on/off unit 600 determines whether the first voltage 20a acquired in step s1 is lower than the first software-off voltage (for example, 10 V). If it is determined to be NO in step s5, step s6 is executed. On the other hand, if it is determined to be YES in step s5, step s7 is executed.

In step s6, the software on/off unit 600 sets the first decreased voltage duration to zero. Here, the first decreased voltage duration means the duration for which the first voltage 20a is lower than the first software-off voltage. After step s6, step s8 is executed.

In step s7, the software on/off unit 600 determines to measure the first decreased voltage duration. In step s7, when the first decreased voltage duration is zero and measurement of the first decreased voltage duration is not currently being performed, the software on/off unit 600 starts measuring the first decreased voltage duration. On the other hand, in step s7, when measurement of the first decreased voltage duration is currently being performed, the software on/off unit 600 continues to measure the first decreased voltage duration. After step s7, step s8 is executed.

In step s8, the software on/off unit 600 determines whether the second voltage 20b acquired in step s1 is lower than the second software-off voltage (for example, 10 V). If it is determined to be NO in step s8, step s9 is executed. On the other hand, if it is determined to be YES in step s8, step s10 is executed.

In step s9, the software on/off unit 600 sets a second decreased voltage duration to zero. Here, the second decreased voltage duration means the duration for which the second voltage 20b is lower than the second software-off voltage. After step s9, step s11 of FIG. 5 is executed.

In step s10, the software on/off unit 600 determines to measure the second decreased voltage duration. In step s10, when the second decreased voltage duration is zero and measurement of the second decreased voltage duration is not currently being performed, the software on/off unit 600 starts measuring the second decreased voltage duration. On the other hand, in step s10, when measurement of the second decreased voltage duration is currently being performed, the software on/off unit 600 continues to measure the second decreased voltage duration. After step s10, step s11 is executed.

As shown in FIG. 5, in step s11, the software on/off unit 600 determines whether the excess voltage duration is at least the software-on start period (for example, 1 second). If it is determined to be YES in step s11, step s13 is executed. On the other hand, if it is determined to be NO in step s11, step s12 is executed.

In step s13, the software on/off unit 600 determines to not output the software-off signal. In step s13, when the software-off signal is currently being output, the software on/off unit 600 stops outputting the software-off signal. On the other hand, in step s13, when the software-off signal is not being output, the software on/off unit 600 continues to not output the software-off signal.

After step s13, in step s14, the software on/off unit 600 determines to output the hardware-off inhibiting signal. In step s14, when the hardware-off inhibiting signal is not being output, the software on/off unit 600 starts outputting the hardware-off inhibiting signal. On the other hand, in step s14, when the hardware-off inhibiting signal is currently being output, the software on/off unit 600 continues to output the hardware-off inhibiting signal. After step s14, step s1 of FIG. 4 is executed again. Subsequently, the software on/off unit 600 operates in a similar manner.

In step s12, the software on/off unit 600 determines to not output the hardware-off inhibiting signal. In step s12, when the hardware-off inhibiting signal is currently being output, the software on/off unit 600 stops outputting the hardware-off inhibiting signal. On the other hand, in step s12, when the hardware-off inhibiting signal is not being output, the software on/off unit 600 continues to not output the hardware-off inhibiting signal. After step s12, step s15 is executed.

In step s15, the software on/off unit 600 determines whether the first decreased voltage duration is at least equal to the first software-off start period (for example, 10 seconds). If it is determined to be YES in step s15, step s17 is executed. On the other hand, if it is determined to be NO in step s15, step s16 is executed.

In step s16, the software on/off unit 600 determines whether the second decreased voltage duration is at least equal to the second software-off start period (for example, 10 seconds). If it is determined to be YES in step s16, step s17 is executed. On the other hand, if it is determined to be NO in step s16, step s1 is executed again. Subsequently, the software on/off unit 600 operates in a similar manner.

In step s17, the software on/off unit 600 determines to output the software-off signal. In step s17, when the software-off signal is not being output, the software on/off unit 600 starts outputting the software-off signal. On the other hand, in step s17, when the software-off signal is currently being output, the software on/off unit 600 continues to output the software-off signal. After step s17, step s1 is executed again. Subsequently, the software on/off unit 600 operates in a similar manner.

Hereinafter, an example of the operations of the relay device 1 will be described using FIGS. 4 and 5.

For example, consider the case where the system 100A and the system 100B are stable and a short circuit has not occurred. In this case, the first voltage 20a and the second voltage 20b will be 12.6 V for example. If the first voltage 20a and the second voltage 20b are maintained at 12.6 V for at least the software-on start period (for example, 1 second), it is determined to be YES in step s11. When a short circuit has not occurred in the system 100A and the system 100B, the software-off signal 6a is thereby not output by the software on/off unit 600, and the hardware-off inhibiting signal 6b is input to the hardware-off unit 5. When the hardware-off inhibiting signal is input to the hardware-off unit 5, the hardware-off unit 5 does not output the hardware-off signal 5a. Therefore, when a short circuit has not occurred in the system 100A and the system 100B, the relay 3 is on.

As another example, consider the case where a short circuit has not occurred in the system 100B, and a short circuit that is large is scale (in other words, a short circuit having a large short circuit current) has occurred in the system 100A, causing the first voltage 20a to decrease to lower than the first hardware-off voltage (for example, 8 V). In this case, in the hardware-off unit 5, the output of the OR circuit 53 will be "1". When the state where the first voltage 20a is lower than the first hardware-off voltage continues for at least the first hardware-off start period (for example, 500 μs), the output of the filter 54 will be "1". On the other hand, since the software on/off unit 600 determines NO in step s11 and executes step s12, the hardware-off inhibiting signal 6b is not input to the hardware-off unit 5. "1" is thereby output by the AND circuit 55 of the hardware-off unit 5, and the hardware-off signal 5a is output by the hardware-off unit 5. Therefore, when a short circuit that is large in scale occurs in the system 100A, the relay 3 is turned off by hardware.

As another example, consider the case where a short circuit has not occurred in the system 100A, and a short circuit that is large is scale has occurred in the system 100B, causing the second voltage 20b to decrease to lower than the second hardware-off voltage (for example, 8 V). In this case, in the hardware-off unit 5, the output of the OR circuit 53 will be "1". When the state where the second voltage 20b is lower than the second hardware-off voltage continues for at least the second hardware-off start period (for example, 500 μs), the output of the filter 54 will be "1". On the other hand, since the software on/off unit 600 determines NO in step s11 and executes step s12, the hardware-off inhibiting signal 6b is not input to the hardware-off unit 5. "1" is thereby output by the AND circuit 55 of the hardware-off unit 5, and the hardware-off signal 5a is output by the hardware-off unit 5. Therefore, when a short circuit that is large in scale occurs in the system 100B, the relay 3 is turned off by hardware.

As another example, consider the case where a short circuit has not occurred in the system 100B, and a short circuit that is small in scale has occurred in the system 100A, causing the first voltage 20a to decrease to lower than the first software-off voltage (for example, 10 V). When the state where the first voltage 20a is lower than the first software-off voltage continues for at least the first software-off start period (for example, 10 seconds), it is determined to be YES in step s15. The software-off signal 6a is thereby output by the software on/off unit 600. At this time, if the hardware-off unit 5 is not outputting the hardware-off signal 5*a*, the state of the relay 3 changes from on to off due to the software-off signal 6*a*. If a short circuit has not occurred in the system 100B, the relay 3 changes from on to off when the state where the first voltage 20*a* is lower than the first software-off voltage (for example, 10 V) and higher than or equal to the first hardware-off voltage (for example, 8 V) continues for at least the first software-off start period (for example, 10 seconds). In the case where the first voltage 20*a* decreases to lower than the first hardware-on voltage (for example, 8 V), the relay 3 is turned off by the hardware-off unit 5, and thus the relay 3 is not turned off by the software-off signal 6*a* even though the software-off signal 6*a* is output by the software on/off unit 600 if it is determined to be YES in step s15.

As another example, consider the case where a short circuit has not occurred in the system 100A, and a short circuit that is small in scale has occurred in the system 100B, causing the second voltage 20*b* to decrease to lower than the second software-off voltage (for example, 10 V). When the state where the second voltage 20*b* is lower than the second software-off voltage continues for at least the second software-off start period (for example, 10 seconds), it is determined to be YES in step s16. The software-off signal 6*a* is thereby output by the software on/off unit 600. At this time, if the hardware-off unit 5 is not outputting the hardware-off signal 5*a*, the state of the relay 3 changes from on to off due to the software-off signal 6*a*. If a short circuit has not occurred in the system 100A, the relay 3 changes from on to off when the state where the second voltage 20*b* is lower than the second software-off voltage (for example, 10 V) and higher than or equal to the second hardware-off voltage (for example, 8 V) continues for at least the second software-off start period (for example, 10 seconds).

As another example, consider the case where the first voltage 20*a* increases to higher than the first software-on voltage (for example, 12 V) due to a short circuit in the system 100A being eliminated, without a short circuit occurring in the system 100B. When the state where the first voltage 20*a* is higher than the first software-on voltage continues for at least the software-on start period (for example, 1 second), it is determined to be YES in step s11. Steps s13 and s14 are then executed. When the relay 3 is turned off by the hardware-off unit 5, the relay 3 changes from off to on, due to the hardware-off inhibiting signal 6*b* being input to the hardware-off unit 5 in the execution of step s14. On the other hand, when the relay 3 is turned off by the software on/off unit 600, the relay 3 changes from off to on, due to the software on/off unit 600 stopping output of the software-off signal 6*a* in the execution of step s13.

As another example, consider the case where the second voltage 20*b* increases to higher than the second software-on voltage (for example, 12 V) due to a short circuit in the system 100B being eliminated, without a short circuit occurring in the system 100A. When the state where the second voltage 20*b* is higher than the second software-on voltage continues for at least the software-on start period (for example, 1 second), it is determined to be YES in step s11. Steps s13 and s14 are then executed. When the relay 3 is turned off by the hardware-off unit 5, the relay 3 changes from off to on, due to the hardware-off inhibiting signal 6*b* being input to the hardware-off unit 5 in the execution of step s14. On the other hand, when the relay 3 is turned off by the software on/off unit 600, the relay 3 changes from off to on, due to the software on/off unit 600 stopping output of the software-off signal 6*a* in the execution of step s13.

As described above, in this example, OFF control for comparing the first voltage 20*a* of the terminal 2A electrically connected to the system 100A with the first hardware-off voltage having a relatively low value (for example, 8 V) and turning off the relay 3 based on the comparison result is executed by hardware. The relay 3 can thereby be turned off by hardware, when the first voltage 20*a* becomes low due to the short circuit in the system 100A being large in scale. As a result, in the case where the short circuit in the system 100A is large in scale, the electrical connection between the system 100A and the system 100B can be turned off straightaway by hardware. Therefore, the system 100B is unlikely to be affected by a short circuit that occurs in the system 100A.

Furthermore, in this example, OFF control for comparing the first voltage 20*a* with the first software-off voltage having a relatively high value (for example, 10 V) and turning off the relay 3 based on the comparison result is executed by software. The relay 3 can thereby be turned off by software, when the first voltage 20*a* does not decrease all that much due to the short circuit in the system 100A being small in scale. In this way, dedicated hardware is not required, due to the relay 3 being turned off by software, thus enabling the circuit to be reduced in size. On the other hand, even though it takes a little time to turn off the relay 3 in the case where the relay 3 is turned off by software, the short circuit in the system 100A being small in scale means that the system 100B is not affected much by the short circuit in the system 100A prior to the relay 3 being turned off.

Therefore, the relay 3 can be appropriately turned off regardless of whether the short circuit in the system 100A is large or small in scale.

Similarly, in this example, OFF control for comparing the second voltage 20*b* with the second hardware-off voltage having a relatively low value (for example, 8 V) and turning off the relay 3 based on the comparison result is executed by hardware. The relay 3 can thereby be turned off by hardware, when the second voltage 20*b* becomes low due to the short circuit in the system 100B being large in scale. As a result, in the case where the short circuit in the system 100B is large in scale, the electrical connection between the system 100B and the system 100A can be turned off straightaway by hardware. Therefore, the system 100A is unlikely to be affected by a short circuit that occurs in the system 100B.

Furthermore, in this example, OFF control for comparing the second voltage 20*b* with the second software-off voltage having a relatively high value (for example, 10 V) and turning off the relay 3 based on the comparison result is executed by software. The relay 3 can thereby be turned off by software, when the second voltage 20*b* does not decrease all that much due to the short circuit in the system 100B being small in scale. In this way, dedicated hardware is not required, due to the relay 3 being turned off by software, thus enabling the circuit to be reduced in size. On the other hand, even though it takes a little time to turn off the relay 3 in the case where the relay 3 is turned off by software, the short circuit in the system 100B being small in scale means that the system 100A is not affected much by the short circuit in the system 100B prior to the relay 3 being turned off.

Also, in this example, ON control for comparing the first voltage 20*a* with the first software-on voltage and turning on the relay 3 based on the comparison result is executed by software. Also, in this example, ON control for comparing the second voltage 20*b* with the second software-on voltage and turning on the relay 3 based on the comparison result is executed by software. In this way, dedicated hardware is not required, due to the relay 3 being turning on by software, thus enabling the circuit to be reduced in size.

Also, in this example, the relay 3 is turned off when the first voltage 20a is lower than the first hardware-off voltage for at least the hardware-off start period. The relay 3 is thereby turned off when the state where the first voltage 20a is lower than the first hardware-off voltage continues. Therefore, the possibility of the relay 3 being erroneously turned off despite a short circuit not having occurred in the system 100A can be reduced.

Similarly, in this example, the relay 3 is turned off when the second voltage 20b is lower than the second hardware-off voltage for at least the hardware-off start period. The possibility of the relay 3 being erroneously turned off despite a short circuit not having occurred in the system 100B can thereby be reduced.

Also, in this example, the relay 3 is turned off when the first voltage 20a is lower than the first software-off voltage for at least the first software-off start period. The relay 3 is thereby turned off, when the state where the first voltage 20a is lower than the first software-off voltage continues. Therefore, the possibility of the relay 3 being erroneously turned off despite a short circuit not having occurred in the system 100A can be reduced.

Similarly, in this example, the relay 3 is turned off when the second voltage 20b is lower than the second software-off voltage for at least the second software-off start period. The possibility of the relay 3 being erroneously turned off despite a short circuit not having occurred in the system 100B can thereby be reduced.

Also, in this example, the relay 3 is turned off, when the first voltage 20a is lower than the first software-off voltage for at least the first software-off start period, which is longer than the first hardware-off start period. The relay 3 is thereby turned off, when the state where the first voltage 20a is lower than the first software-off voltage continues for a relatively long time. Therefore, when the short circuit in the system 100A is small in scale, the electrical connection between the system 100A and the system 100B can be maintained for a relatively long time.

Similarly, in this example, the relay 3 is turned off when the second voltage 20b is lower than the second software-off voltage for at least the second software-off start period, which is longer than the second hardware-off start period. The relay 3 is thereby turned off, when the state where the second voltage 20b is lower than the second software-off voltage continues for a relatively long time. Therefore, when the short circuit in the system 100B is small in scale, the electrical connection between the system 100B and the system 100A can be maintained for a relatively long time.

Also, as shown in this example, in the case of turning on the relay 3 when the first voltage 20a is higher than the first software-on voltage for at least the software-on start period, which is longer than the hardware-off start period, the relay 3 can be turned on when the state where the first voltage 20a is higher than the first software-on voltage continues for a relatively long time. Therefore, the possibility of the relay 3 being erroneously turned on despite the short circuit in the system 100A not having been eliminated is reduced.

Similarly, in the case of turning on the relay 3 when the second voltage 20b is higher than the second software-on voltage for at least the software-on start period, which is longer than the hardware-off start period, the relay 3 can be turned on when the second voltage 20b is higher than the second software-on voltage for a relatively long time. Therefore, the possibility of the relay 3 being erroneously turned on despite the short circuit in the system 100B not having been eliminated is reduced.

Also, in the case of turning on the relay 3 when the first voltage 20a is higher than the first software-on voltage for at least the software-on start period, which is shorter than the first software-off start period, the relay 3 can be turned on even if the duration of the state where the first voltage 20a is higher than the software-on voltage is not so long. Therefore, the relay 3 can be turned on straightaway in the case where the short circuit in the system 100A has been eliminated.

Similarly, in the case of turning on the relay 3 when the second voltage 20b is higher than the second software-on voltage for at least the software-on start period, which is shorter than the second software-off start period, the relay 3 can be turned on even if the duration of the state where the second voltage 20b is higher than the software-on voltage is not so long. Therefore, the relay 3 can be turned on straightaway in the case where the short circuit in the system 100B has been eliminated.

Figure 6:
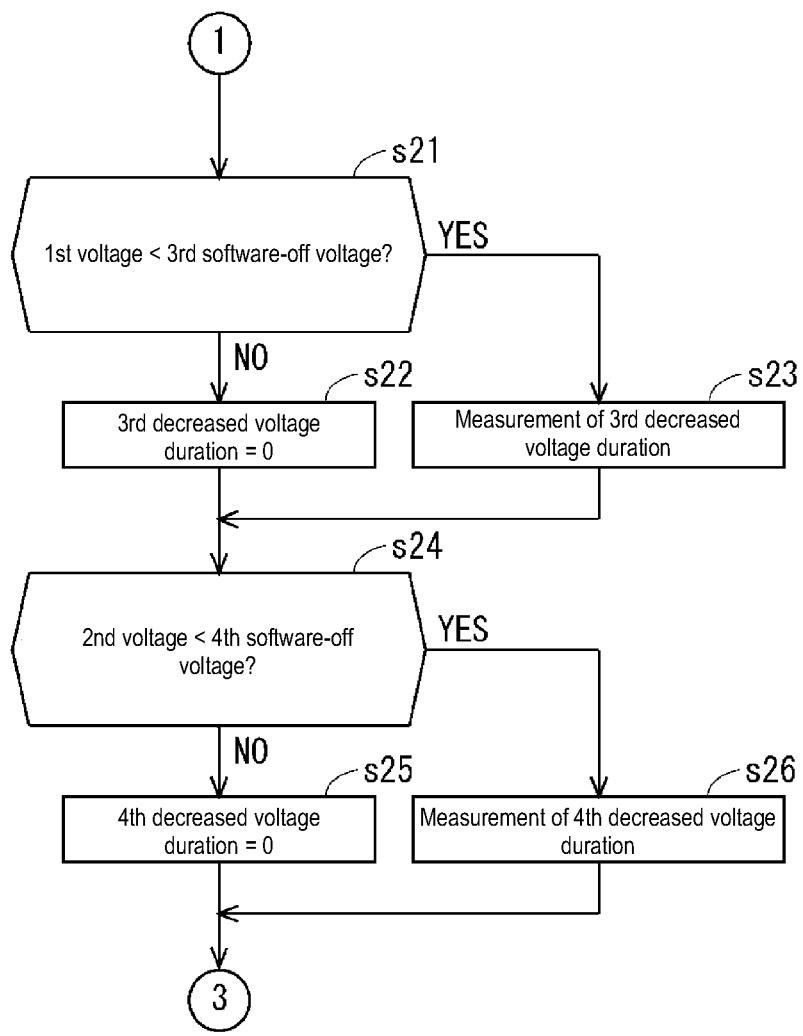
FIG. 6 is a flowchart showing an example of the operations of the software on/off unit.
Figure 7:
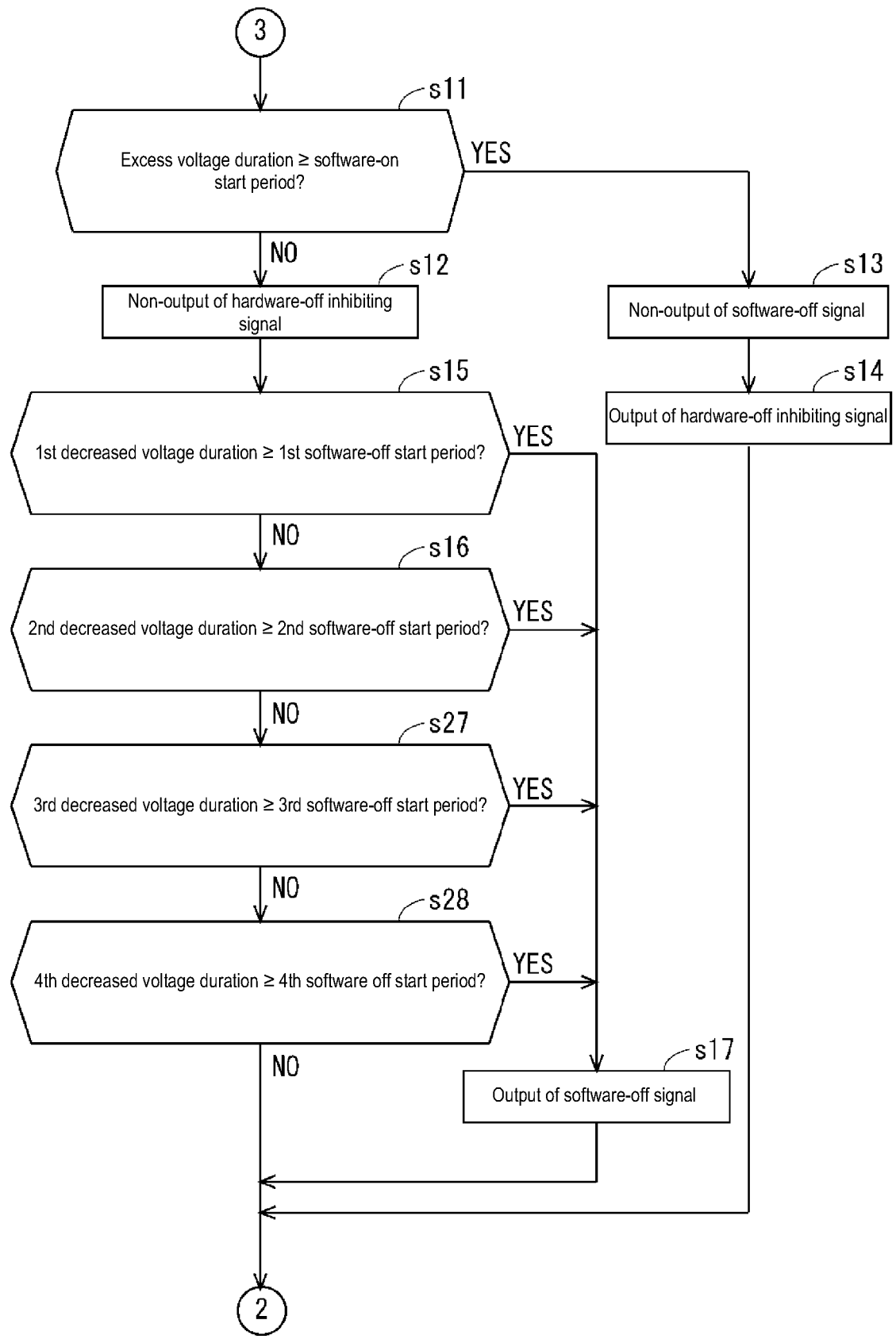
FIG. 7 is a flowchart showing an example of the operations of the software on/off unit.

In the above example, in the case of turning off the relay 3 based on the first voltage 20a, the software on/off unit 600 compares the first voltage 20a with one threshold voltage (i.e., first software-off voltage), but may compare the first voltage 20a with a plurality of threshold voltages that differ from each other. Similarly, the software on/off unit 600 may compare the second voltage 20b with a plurality of threshold voltages that differ from each other. FIGS. 6 and 7 are flowcharts showing an example of the operations of the software on/off unit 600 in this case. In the examples of FIGS. 6 and 7, the software on/off unit 600 compares the first voltage 20a with two threshold voltages, and compares the second voltage 20b with two threshold voltages.

Once step s9 described above has been executed, step s21 is executed, as shown in FIG. 6. Step s21 is also executed after step s10 described above. In step s21, the software on/off unit 600 determines whether the first voltage 20a acquired in step s1 is lower than a third software-on voltage, which is a threshold voltage. The third software-off voltage is set higher than the first hardware-off voltage and lower than the first software-off voltage. The third software-off voltage is set to 9 V, for example. If it is determined to be NO in step s21, step s22 is executed. On the other hand, if it is determined to be YES in step s21, step s23 is executed.

In step s22, the software on/off unit 600 sets a third decreased voltage duration to zero. Here, the third decreased voltage duration means the duration of the state where the first voltage 20a is lower than the third software-off voltage. After step s22, step s24 is executed.

In step s23, the software on/off unit 600 determines to measure the third decreased voltage duration. In step s23, when the third decreased voltage duration is zero and measurement of the third decreased voltage duration is not currently being performed, the software on/off unit 600 starts measuring the third decreased voltage duration. On the other hand, in step s23, when measurement of the third decreased voltage duration is currently being performed, the software on/off unit 600 continues to measure the third decreased voltage duration. After step s23, step s24 is executed.

In step s24, the software on/off unit 600 determines whether the second voltage 20b acquired in step s1 is lower than a fourth software-off voltage, which is a threshold voltage. The fourth software-off voltage is set higher than the second hardware-off voltage and lower than the second software-off voltage. The fourth software-off voltage is the same as the third software-off voltage, for example, and is set to 9V, for example. If it is determined to be NO in step s24, step s25 is executed. On the other hand, if it is determined to be YES in step s24, step s26 is executed.

In step s25, the software on/off unit 600 sets a fourth decreased voltage duration to zero. Here, the fourth decreased voltage duration means the duration of the state where the second voltage 20*b* is lower than the fourth software-off voltage. After step s25, step s11 described above is executed (see FIG. 11).

In step s26, the software on/off unit 600 determines to measure the fourth decreased voltage duration. In step s26, when the fourth decreased voltage duration is zero and measurement of the fourth decreased voltage duration is not currently being performed, the software on/off unit 600 starts measuring the fourth decreased voltage duration. On the other hand, in step s26, when measurement of the fourth decreased voltage duration is currently being performed, the software on/off unit 600 continues to measure the fourth decreased voltage duration. After step s26, step s11 described above is executed.

Similarly to FIG. 5, if it is determined to be YES in step s11, steps s13 and s14 are executed, and thereafter step s1 is executed again. On the other hand, if it is determined to be NO in step s11, steps s12, s15 and s16 are executed, similarly to FIG. 5. If it is determined to be NO in step s16, step s27 is executed.

In step s27, the software on/off unit 600 determines whether the third decreased voltage duration is at least equal to a third software-off start period, which is a threshold period. The third software-off start period is set longer than the hardware-off start period and shorter than the first software-off start period, for example. The third software-off start period is set to 5 seconds, for example. If it is determined to be YES in step s27, step s17 is executed. On the other hand, if it is determined to be NO in step s27, step s28 is executed.

In step s28, the software on/off unit 600 determines whether the fourth decreased voltage duration is at least equal to a fourth software-off start period. The fourth software-off start period is set longer than the hardware-off start period and shorter than the second software-off start period, for example. The fourth software-off start period is set to the same as the third software-off start period, for example, and is set to 5 seconds, for example. If it is determined to be YES in step s28, step s17 is executed. On the other hand, if it is determined to be NO in step s28, step s1 is executed again. Subsequently, the software on/off unit 600 operates in a similar manner.

In the examples of FIGS. 6 and 7, the software on/off unit 600 turns off the relay 3 based on the result of comparing the first voltage 20*a* with the third software-off voltage having a relatively low value, and turns off the relay 3 based on the result of comparing the first voltage 20*a* with the first software-off voltage having a relatively high value. The relay 3 can thereby be appropriately turned off, even if a short circuit that is small in scale or a short circuit that is fairly small in scale occurs in the system 100A.

In the examples of FIGS. 6 and 7, the relay 3 is turned off when, for example, the first voltage 20*a* decreases to lower than the third software-off voltage (for example, 9 V) due to a short circuit that is not so small in scale occurring in the system 100A, and this state continues for at least the third software-off start period (for example, 5 seconds). When the short circuit in the system 100A is not so small in scale, the electrical connection between the system 100A and the system 100B is thereby maintained for only a relatively short time. On the other hand, the relay 3 is turned off when the first voltage 20*a* decreases to lower than the first software-off voltage (for example, 10 V) due to a short circuit that is fairly small in scale occurring in the system 100A, and this state continues for at least the first software-off start period (for example, 10 seconds). When the short circuit in the system 100A is fairly small in scale, the electrical connection between the system 100A and the system 100B is thereby maintained for a relatively long time. Therefore, the time for which the electrical connection between the system 100A and the system 100B is maintained can be appropriately changed, according to the scale of the short circuit in the system 100A.

Similarly, in the example of FIGS. 6 and 7, the relay 3 is turned off when, for example, the second voltage 20*b* decreases to lower than the fourth software-off voltage (for example, 9 V) due to a short circuit that is not so small in scale occurring in the system 100B, and this state continues for at least the fourth software-off start period (for example, 5 seconds). When the short circuit in the system 100B is not so small in scale, the electrical connection between the system 100B and the system 100A is thereby maintained for only a relatively short time. On the other hand, the relay 3 is turned off when the second voltage 20*b* decreases to lower than the first software-off voltage (for example, 10 V) due to a short circuit that is fairly small in scale occurring in the system 100B, and this state continues for at least the first software-off start period (for example, 10 seconds). When the short circuit in the system 100B is fairly small in scale, the electrical connection between the system 100A and the system 100B is thereby maintained for a relatively long time. Therefore, the time for which the electrical connection between the system 100B and the system 100A is maintained can be appropriately changed, according to the scale of the short circuit in the system 100B.

The configuration and operations of the relay device 1 are not limited to the above examples. For example, the hardware-off unit 5 may output the hardware-off signal 5*a* when the first voltage 20*a* is lower than the first hardware-off voltage for at least the first hardware-off start period, and may output the hardware-off signal 5*a* when the first voltage 20*a* is lower than the second hardware-off voltage for at least the second hardware-off start period. The first hardware-off start period may be the same as the second hardware-off start period or may differ from the second hardware-off start period.

Also, in the above example, the first hardware-off voltage and the second hardware-off voltage are the same as each other, but may differ from each other. Similarly, the first software-off voltage and the second software-off voltage may differ from each other, and the third software-off voltage and the fourth software-off voltage may differ from each other.

Also, in the above example, the first software-off start period and the second software-off start period are the same as each other, but may differ from each other. Similarly, the third software-off start period and the fourth software-off start period may differ from each other.

Also, in the above example, the relay device 1 responds to both a short circuit in the system 100A and a short circuit in the system 100B, but the relay device 1 may respond to only one of a short circuit in the system 100A and a short circuit in the system 100B, due to the control unit 4 observing only one of the first voltage 20*a* and the second voltage 20*b*. For example, when the control unit 4 observes only the first voltage 20*a* out of the first voltage 20*a* and the second voltage 20*b*, the comparator 52 and the OR circuit 53 are not required in the hardware-off unit 5, and the configuration of the hardware-off unit 5 is simplified. Also, in the processing of FIGS. 4 and 5, the execution of at least steps s8, s9, s10 and s16 is not required, and thus the processing in the software on/off unit 600 is simplified.

Also, in FIG. 4, the order in which the processing of steps s2 and s4, the processing of steps s5 and s7 and the processing of steps s8 and s10 are executed may be changed. Also, in FIG. 5, the order in which steps s15 and step s16 are executed may be changed. Also, in the processing of FIGS. 4 and 6, the order in which the processing of steps s2 to s4, the processing of steps s5 to s7, the processing of steps s8 to s10, the processing of steps s21 to s23, and the processing of steps s24 to s25 is executed may be changed. Also, in FIG. 7, the order in which step s15, step s16, step s27 and step s28 are executed may be changed.

Also, in the above example, the ON control for turning on the relay 3 based on the first voltage 20a and the second voltage 20b is executed by software, but may be executed by hardware.

Also, a configuration may be adopted in which only the battery 101A is electrically connected to the terminal 2A, and only at least one load 102B is electrically connected to the terminal 2B. Similarly, a configuration may be adopted in which only the battery 101B is electrically connected to the terminal 2B, and only at least one load 102A is electrically connected to the terminal 2A.

Although the relay device 1 has been described in detail above, the foregoing description is exemplary in all aspects and this disclosure is not limited thereto. Also, the various modifications described above are applicable in combination as long as there are no inconsistencies therebetween. Further, it should be understood that numerous modifications not illustrated herein can be contemplated without departing from the scope of this disclosure.

The invention claimed is:

1. A relay device for switching on/off of an electrical connection between a first target and a second target, comprising:
   a first terminal electrically connected to the first target;
   a second terminal electrically connected to the second target;
   a relay configured to switch on/off of the electrical connection between the first terminal and the second terminal; and
   a control unit configured to perform ON/OFF control of the relay,
   wherein the control unit
      executes, by hardware, a first OFF control for comparing a first voltage of the first terminal with a first threshold voltage, and turning off the relay based on a result of the comparison, wherein the relay is turned off by hardware when the first voltage is below the first threshold voltage and
      executes, by software, a second OFF control for comparing the first voltage with a second threshold voltage higher than the first threshold voltage, and turning off the relay based on a result of the comparison, wherein the relay is turned off by software when the first voltage is lower than the second threshold voltage.

2. The relay device according to claim 1, wherein, in the first OFF control by hardware, the relay is turned off when the first voltage is lower than the first threshold voltage for at least a first threshold period.

3. The relay device according to claim 1, wherein, in the second OFF control by software, the relay is turned off when the first voltage is lower than the second threshold voltage for at least a threshold period.

4. The relay device according to claim 2, wherein, in the second OFF control by software, the relay is turned off when the first voltage is lower than the second threshold voltage for at least a second threshold period longer than the first threshold period.

5. The relay device according to claim 4, wherein the control unit executes third OFF control for comparing the first voltage with a third threshold voltage higher than the first threshold voltage and lower than the second threshold voltage, and turning off the relay based on a result of the comparison, and
   in the third OFF control by software, the relay is turned off when the first voltage is lower than the third threshold voltage for at least a third threshold period longer than the first threshold period and shorter than the second threshold period.

6. The relay device according to claim 1, wherein the control unit executes, by software, ON control for comparing the first voltage with a third threshold voltage higher than the first threshold voltage and the second threshold voltage, and turning on the relay based on a result of the comparison.

7. The relay device according to claim 6, wherein, in the first OFF control by hardware, the relay is turned off when the first voltage is lower than the first threshold voltage for at least a first threshold period, and,
   in the ON control by software, the relay is turned on when the first voltage is higher than the third threshold voltage for at least a second threshold period longer than the first threshold period.

8. The relay device according to claim 6, wherein, in the second OFF control by software, the relay is turned off when the first voltage is lower than the second threshold voltage for at least a first threshold period, and
   in the ON control by software, the relay is turned on when the first voltage is higher than the third threshold voltage for at least a second threshold period shorter than the first threshold period.

9. The relay device according to claim 1, wherein the control unit:
   executes, by hardware, fourth OFF control for comparing a second voltage of the second terminal with a fourth threshold voltage, and turning off the relay based on a result of the comparison, and
   executes, by software, fifth OFF control for comparing the second voltage with a fifth threshold voltage higher than the fourth threshold voltage, and turning off the relay based on a result of the comparison.

* * * * *